(12) United States Patent
Bertini

(10) Patent No.: US 11,391,476 B2
(45) Date of Patent: Jul. 19, 2022

(54) METHOD OF IDENTIFYING BURNING BY MONITORING WATER LEVEL AND COMBUSTION ANALYTES

(71) Applicant: Novinium, Inc., Kent, WA (US)

(72) Inventor: Glen J. Bertini, Fox Island, WA (US)

(73) Assignee: NOVINIUM, INC., Kent, WA (US)

( * ) Notice: Subject to any disclaimer, the term of this patent is extended or adjusted under 35 U.S.C. 154(b) by 549 days.

(21) Appl. No.: 16/514,530

(22) Filed: Jul. 17, 2019

(65) Prior Publication Data

US 2020/0025398 A1 Jan. 23, 2020

Related U.S. Application Data

(60) Provisional application No. 62/702,228, filed on Jul. 23, 2018.

(51) Int. Cl.
| | |
|---|---|
| *F24F 11/00* | (2018.01) |
| *E02D 29/12* | (2006.01) |
| *E02D 29/00* | (2006.01) |
| *G08B 29/04* | (2006.01) |
| *E21B 35/00* | (2006.01) |

(Continued)

(52) U.S. Cl.
CPC .......... *F24F 11/0001* (2013.01); *E02D 29/10* (2013.01); *E02D 29/12* (2013.01); *E21B 35/00* (2013.01); *E21B 47/047* (2020.05); *F24F 13/029* (2013.01); *G01F 23/804* (2022.01); *G08B 25/14* (2013.01); *G08B 29/043* (2013.01); *F24F 2110/65* (2018.01); *G08B 17/00* (2013.01)

(58) Field of Classification Search
CPC .. F24F 11/0001; F24F 13/029; F24F 2110/65; E02D 29/10; E02D 29/12; E21B 35/00; E21B 47/047; G01F 23/804; G08B 25/14; G08B 29/043; G08B 17/00
See application file for complete search history.

(56) References Cited

U.S. PATENT DOCUMENTS

| | | | |
|---|---|---|---|
| 8,757,280 B2 * | 6/2014 | Cordani | A62C 3/16 169/44 |
| 9,216,308 B2 * | 12/2015 | Cordani | A62C 3/16 |

(Continued)

FOREIGN PATENT DOCUMENTS

CN 102162375 8/2011

OTHER PUBLICATIONS

US 10,843,021 B2, 11/2020, Hyland (withdrawn)

(Continued)

*Primary Examiner* — John A Tweel, Jr.
(74) *Attorney, Agent, or Firm* — Davis Wright Tremaine LLP; George C. Rondeau, Jr.; Heather M. Colburn

(57) ABSTRACT

A method for use with an underground network that includes a plurality of locations. The method includes receiving sensor data from at least one sensor located at a first of the plurality of locations and determining the sensor data indicates that a fire is in progress. The method includes identifying one or more of the locations as one or more potential combustion locations and assigning an estimate of a probability to each of the potential combustion location(s). The estimate estimates a likelihood that the potential combustion location is an actual combustion source. The method may include displaying the estimate of the probability assigned to each of the one or more potential combustion locations.

23 Claims, 4 Drawing Sheets

(51) Int. Cl.
  *E21B 47/047* (2012.01)
  *G01F 23/80* (2022.01)
  *F24F 13/02* (2006.01)
  *G08B 25/14* (2006.01)
  *F24F 110/65* (2018.01)
  *G08B 17/00* (2006.01)

(56) References Cited

U.S. PATENT DOCUMENTS

| | | |
|---|---|---|
| 9,784,650 B1 | 10/2017 | Neathery |
| 10,684,031 B2 | 6/2020 | Steele et al. |
| 10,801,663 B2 | 10/2020 | Lambe |
| 10,883,347 B2 | 1/2021 | Bertini et al. |
| 10,883,348 B2 | 1/2021 | Bertini et al. |
| 10,962,253 B2 | 3/2021 | Bertini et al. |
| 11,035,770 B2 | 6/2021 | Bertini et al. |
| 11,054,404 B2 | 7/2021 | Bertini et al. |
| 11,060,754 B2 | 7/2021 | Bertini et al. |
| 11,079,311 B2 | 8/2021 | Bertini et al. |
| 2002/0184956 A1 | 12/2002 | Taylor et al. |
| 2004/0135695 A1 | 7/2004 | Barton et al. |
| 2007/0103324 A1 | 5/2007 | Kosuge et al. |
| 2010/0050330 A1 | 3/2010 | Earlywine |
| 2011/0316699 A1 | 12/2011 | Arunachalam |
| 2013/0271751 A1 | 10/2013 | MacGregor et al. |
| 2014/0202722 A1 | 7/2014 | Cordani |
| 2017/0082573 A1 | 3/2017 | Vingerhoets et al. |
| 2017/0284689 A1 | 10/2017 | Steele et al. |
| 2019/0166413 A1 | 5/2019 | Klinger et al. |
| 2020/0064319 A1 | 2/2020 | Mcnulty et al. |
| 2020/0115880 A1 | 4/2020 | Bertini |
| 2020/0116688 A1 | 4/2020 | Bertini et al. |
| 2020/0116693 A1 | 4/2020 | Bertini et al. |
| 2020/0141340 A1 | 5/2020 | Malm |
| 2020/0359935 A1 | 11/2020 | Clemensen et al. |
| 2021/0361992 A1* | 11/2021 | Farzam ................ A62C 35/68 |

OTHER PUBLICATIONS

Bertini, G., "Manhole Explosion and Its Root Causes," IEEE Electrical Insulation Magazine, 2019, 35(1):45-54.
Boettner et al, "Combustion Products from the Incineration of Plastics," Michigan University 1973, prepared for the Office of Research and Development U.S. Environmental Protection Agency, Washington D.C. 20460. EPA-670/2-73-049, 156 pages.
Garcez and Almeida, "Multidimensional Risk Assessment of Manhole Events as a Decision Tool for Ranking the Vaults of an Underground Electricity Distribution System," IEEE Transactions on Power Delivery, 2014, 29(2):624-632.
Kondo et al., ""Extended Le Chatelier's formula for carbon dioxide dilution effect on flammability limits," Journal ofHazardous Materials, 2006, A138:1-8."
Newton et al., "Manhole Monitoring solutions: safer, smarter for aging infrastructure," www.utilityproducts.com, Apr. 1, 2017, 9 pages.
Sun, Ma and Boggs, "Initiation of a Typical Network Secondary Manhole Event," IEEE Electrical Insulation Magazine, v.31.n.3, May/Jun. 2015.
W. Wagner and A. Pruß, "The IAPWS Formulation 1995 for the Thermodynamic Properties of Ordinary Water Substance for General and Scientific Use," Journal of Physical and Chemical Reference Data, Jun. 2002 ,vol. 31, Issue 2, pp. 387535.
Zabetakis, Michael, "Flammability Characteristics of Combustible Gases and Vapors," 1965, U.S. Department of Interior, Bureau of Mines Bulletin 627, 130 pages.
Zhang and Boggs, "Manhole Events Caused by Secondary Cable Insulation Breakdown," 2008 Annual Report Conference on Electrical Insulation Dielectric Phenomena, pp. 107-110.
Zhang, Boggs, et al, "The Electro-Chemical Basis of Manhole Events," IEEE Electrical Insulation Magazine, vol. 25, No. 5, Sep. 10, 2009.
Zhang and Boggs, "Effect of Limiting Airflow in Mitigating Combustion-Driven Manhole Events," IEEE, 2011, 27 (6):37-44.
Zhang, Lili "Mitigation of Manhole Events Caused by Secondary Cable Failure," University of Connecticut, 2011, 121 pages.
Information Disclosure Statement Transmittal filed herewith.

* cited by examiner

METHOD OF IDENTIFYING BURNING BY MONITORING WATER LEVEL AND COMBUSTION ANALYTES

CROSS REFERENCE TO RELATED APPLICATION(S)

This application claims the benefit of U.S. Provisional Application No. 62/702,228, filed on Jul. 23, 2018, which is incorporated herein by reference in its entirety.

BACKGROUND OF THE INVENTION

Field of the Invention

The present invention is directed generally to methods of determining that burning is occurring inside a manhole vault system and locating the source of the burning.

Description of the Related Art

In recent years, the importance of monitoring underground vaults (e.g., manhole vaults) for the purposes of avoiding manhole events has been recognized. Manhole events include both minor incidents (such as smoke or small fires) and/or major events (such as sustained fires and explosions). Devices have been described to monitor the conditions inside a manhole vault. For example, U.S. patent application Ser. No. 15/476,775, filed on Mar. 31, 2017, and titled SMART SYSTEM FOR MANHOLE EVENT SUPPRESSION SYSTEM describes a data logger.

Devices configured to monitor the conditions inside a manhole vault include at least one sensor together with the hardware and software configured to operate the sensor(s). Non-limiting examples of the sensor(s) include one or more of the following: a pressure sensor, a temperature sensor, a humidity sensor, a visible light camera, an infra-red camera, a motion sensor, a liquid water level sensor, a particulate sensor, a smoke sensor or detector, and a chemical concentration sensor. Chemical concentration sensors may be configured to detect one or more of the following: $O_2$, $CO_2$, CO, VOCs (volatile organic compounds), NO, $NO_2$, $O_3$, and $H_2S$. For many conditions and events of interest to vault owners, more than a single sensor provides complimentary results. For example, a VOC concentration sensor, an $O_2$ concentration sensor, a $CO_2$ concentration sensor, a humidity sensor, and a temperature sensor may be considered complimentary sensors when used to detect oxidative decomposition of methane because oxidative decomposition of methane reduces the presence of VOCs (methane is a VOC) and $O_2$, while increasing the concentration of both water (humidity) and $CO_2$, and increasing temperature. Thus, these five sensors are complimentary sensors in the detection of oxidative decomposition of methane.

The chemistry of fires in manholes is described in some detail in G. Bertini, "Manhole Explosion and Its Root Causes," IEEE Electrical Insulation Magazine, V. 35, No. 1, January/February 2019, which is incorporated herein by reference in its entirety.

BRIEF DESCRIPTION OF THE SEVERAL VIEWS OF THE DRAWING(S)

Like reference numerals have been used in the figures to identify like components.

DETAILED DESCRIPTION OF THE INVENTION

Figure 1:
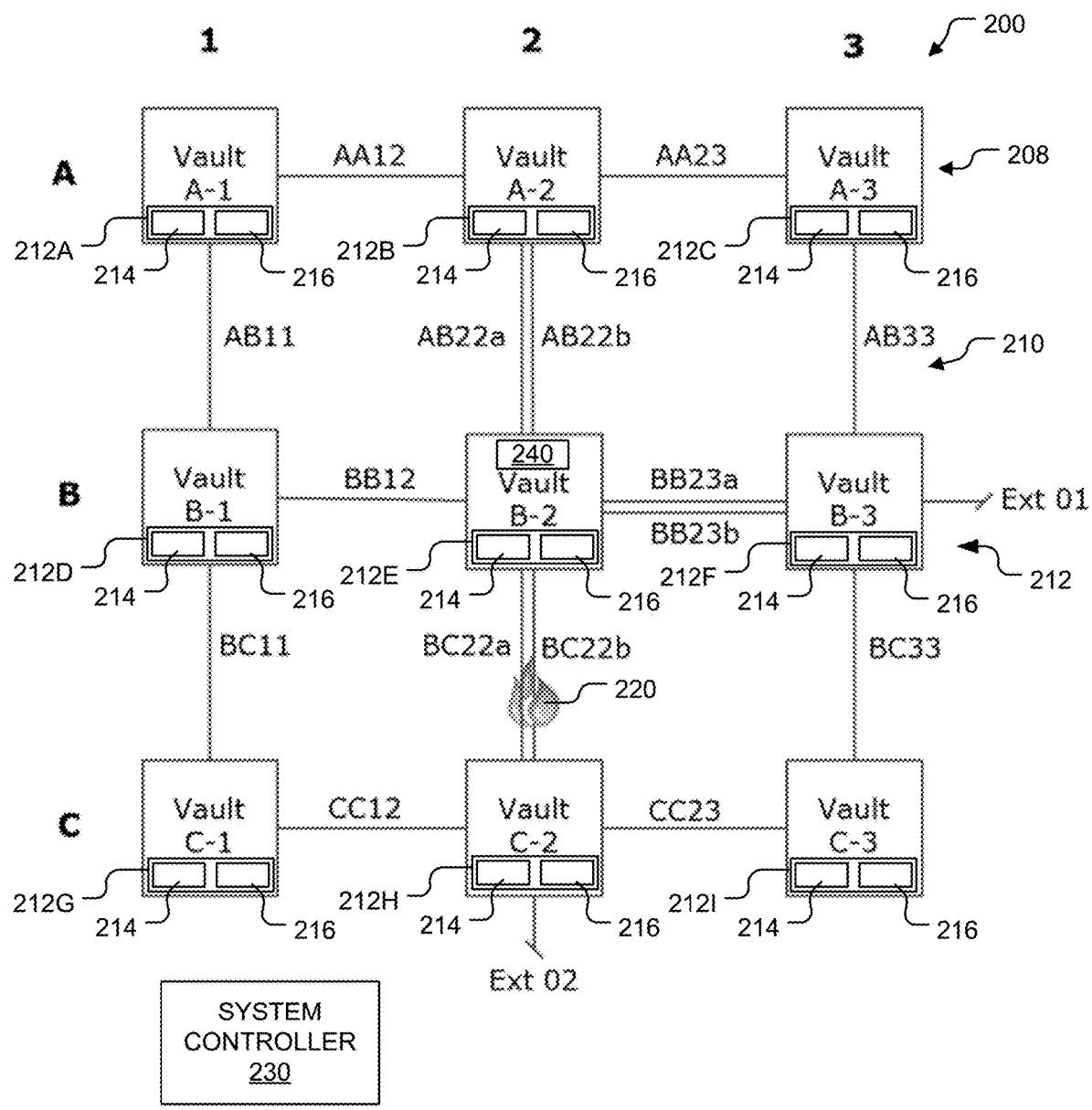
FIG. 1 is an illustration of a simplified network of underground vaults and underground connections.

FIG. 1 illustrates a simplified network 200 of underground vaults 208 and underground connections 210. The network 200 includes at least one monitor 212 and a system controller 230.

In FIG. 1, the vaults 208 include nine vaults A-1 to A-2, B-1 to B-3, and C-1 to C-3. One or more of the vaults 208 may house electrical equipment and/or electrical cables. Each of the vaults 208 may be characterized as being a node. Thus, FIG. 1 shows a simple nine-node network with two external connections Ext 01 and Ext 02. The external connection Ext 01 is connected to the vault B-3 and the external connection Ext 02 is connected to the vault C-2.

Optionally, one or more of the vaults 208 may include a manhole event suppression system 240, which may be implemented in accordance with any of the ventilation systems described in U.S. patent application Ser. No. 15/084,321 filed on Mar. 29, 2016, and titled "VENTILATION SYSTEM FOR MANHOLE VAULT," U.S. patent application Ser. No. 15/173,633, filed on Jun. 4, 2016, titled "SYSTEMS FOR CIRCULATING AIR INSIDE A MANHOLE VAULT," or U.S. patent application Ser. No. 15/476,775, filed on Mar. 31, 2017, and titled "SMART SYSTEM FOR MANHOLE EVENT SUPPRESSION SYSTEM." All of three of the aforementioned applications are incorporated herein by reference in their entireties. The manhole event suppression system 240 may blow air from an external atmosphere outside the vault into an internal atmosphere inside the vault and/or from the internal atmosphere into the external atmosphere. Such air exchange may be referred to as ventilation.

The present application also incorporates herein by reference the following applications in their entireties:

U.S. patent application Ser. No. 16/162,260, filed on Oct. 16, 2018, titled "CALIBRATIONLESS OPERATION METHOD;"

U.S. patent application Ser. No. 16/189,639, filed on Nov. 13, 2018, titled "METHODS OF USING COMPONENT MASS BALANCE TO EVALUATE MANHOLE EVENTS;"

U.S. patent application Ser. No. 16/190,832, filed on Nov. 14, 2018, titled "METHODS OF USING COMPONENT MASS BALANCE TO EVALUATE MANHOLE EVENTS;"

U.S. patent application Ser. No. 16/207,633, filed on Dec. 3, 2018, titled "METHODS OF USING DILUTION OF A FIRST TYPE TO CALIBRATE ONE OR MORE SENSORS;"

U.S. patent application Ser. No. 16/208,098, filed on Dec. 3, 2018, titled "METHODS AND SYSTEMS FOR DETECTING MANHOLE EVENTS;"

U.S. patent application Ser. No. 16/208,120, filed on Dec. 3, 2018, titled "FLOW RESTRICTOR FOR INSTALLATION IN AN UNDERGROUND CONDUIT CONNECTED TO AN UNDERGROUND VAULT;"

U.S. patent application Ser. No. 16/219,137, filed on Dec. 13, 2018, titled "METHODS OF USING DILUTION OF A SECOND TYPE TO CALIBRATE ONE OR MORE SENSORS;" and U.S. patent application Ser. No. 16/234,246, filed on Dec. 27, 2018, titled "METHODS OF USING TRIANGULATION TO LOCATE A MANHOLE EVENT IN A SYSTEM OF UNDERGROUND VAULTS."

In the embodiment illustrated, the connections 210 include connections AA12, AA23, BB12, BB23a, BB23b, CC12, CC23, AB11, AB22a, AB22b, AB33, BC11, BC22a, BC22b, and BC33. Each of the connections 210 connects a pair of the vaults 208 together. For example, the connection AA12 connects the pair of vaults A-1 and A-2 together. Each of the connections 210 may be implemented as conduit, duct, or pipe. Some of the connections 210 include at least one cable that extends therethrough. If a connection includes one or more cables, a gap may be defined between the cable(s) and the connection. Such a gap provides fluidic communication between the connected vaults. Thus, a fluidic flow may be present between the connected vaults. In some cases, a technique referred to as duct plugging, which involves installing a plug between the cable(s) and the connection, may be used to limit such fluidic flow. Unfortunately, all such duct plugs are likely to leak after aging and especially if a fire (oxidative decomposition, pyrolysis, and/or plasmatization) occurs and creates a positive pressure in the gap defined between the cable(s) and the connection. Thus, generally speaking, the connections 210 allow at least some communication between the vaults 208.

For ease of illustration, FIG. 1 omits connections (e.g., conduits) between building(s) owned by the vault owner's customers and one or more of the vaults 208 and/or the connections 210. These connections provide electrical and fluidic communication with one or more adjacent buildings that may serve as pathways for dangerous gases to enter customer premises. Additionally, these connections may provide additional sources of undesirable gases inside the network 200.

The at least one monitor 212 has been illustrated as monitors 212A-212I positioned inside the vaults A-1 to A-2, B-1 to B-3, and C-1 to C-3, respectively. However, this is not a requirement. The network 200 may include any number of monitors each like the monitors 212A-212I installed in any of the vaults 208 and/or the connections 210. Each of the monitors 212A-212I includes a water level sensor 214 and at least one fire detection sensor 216 together with hardware and software configured to operate the sensors 214 and 216.

The system controller 230 communicates over wireless or wired connections with the monitors 212A-212I. The monitors 212A-212I are each configured to send sensor data captured by the sensors 214 and 216 to the system controller 230. By way of a non-limiting example, the system controller 230 may be implemented as a computing device 12 illustrated in FIG. 4 and described below.

Monitoring conditions inside the network 200 (e.g., using the monitors 212A-212I) provides data that may be used by the system controller 230 to answer the following three critical questions:

1. Are flammable gases present inside a vault and/or connection that could contribute to a fire or explosion?
2. Are gases present inside a vault and/or connection that indicate a fire (oxidative decomposition, pyrolysis, and/or plasmatization) is occurring?
3. If the answer to at least one of the first and second critical questions is "YES," from where precisely are the gases emanating?

When the answer to at least one of the first and second critical questions is "YES," the system controller 230 may alert the operator of the network 200. The utility of being alerted when the answer to at least one of the first and second critical questions is "YES," is obvious. The utility of the answer to the third critical question is not as obvious, particularly to those individuals who do not operate networks like the network 200. When the answer to at least one of the first and second critical questions is "YES," it is necessary for the system owner to find and repair the issue. The very first step is to cut electrical power to the offending circuit as that electrical energy contributes to the fire, provides additional sources of ignition, and is potentially hazardous to maintenance personnel. Extinguishing a fire, if one exists, is the very next step. Clearing smoke and flammable vapors is next on the responder's agenda. Smoke, flammable gases, and toxic gases may leak from the circuit owner's vaults to connected customer facilities. Furthermore, the circuit owner's customers are inconvenienced by a power outage while troubleshooting proceeds. Hence, it is most preferable to pinpoint the specific conduit that is causing the problem or at least to eliminate some of the circuits and conduits which can be ignored. Reducing the required troubleshooting time minimizes and mitigates all of the costs, dangers, and inconveniences outlined above.

FIG. 1 illustrates a fire 220 (oxidative decomposition, pyrolysis, and/or plasmatization) in the connection BC22b connecting the vaults B-2 and C-2. Thus, the fire 220 is producing gases or particulates (e.g., CO, $CO_2$, carbon agglomerates) that are detectable by the fire detection sensor(s) 216 of the monitor 212E. When fire detection sensor(s) 216 indicates a fire (oxidative decomposition, pyrolysis, and/or plasmatization) has been detected, identifying the location of the fire is required before safe operations can resume. The fire detection sensor(s) 216 may include a temperature sensor, a humidity sensor, a visible light camera, an infra-red camera, a motion sensor, a particulate sensor, a smoke sensor or detector, and chemical concentration sensor(s). Examples of chemical concentration sensors that may be used to implement one or more of the fire detection sensor(s) 216 include sensors configured to detect $O_2$, $CO_2$, CO, VOCs, NO, $NO_2$, and $O_3$. By way of non-limiting examples, the fire detection sensor(s) 216 may detect one or more of the following conditions, which indicate a corresponding fire specified in parenthesis:

i. $CO_2$ is elevated (oxidative decomposition);
ii. CO is elevated (pyrolysis);
iii. VOCs are elevated (pyrolysis);
iv. NO is elevated (evidence of plasma/electrical discharge);
v. $NO_2$ is elevated (evidence of plasma/electrical discharge);
vi. $O_3$ is elevated (evidence of plasma/electrical discharge);
vii. $H_2O$ (absolute humidity) is elevated (oxidative decomposition);
viii. $O_2$ is depressed (dilution by i-vii, and consumption by oxidative decomposition and partial pyrolysis);
ix. Temperature is elevated (oxidative decomposition);
x. Particulates are elevated (any or all oxidative decomposition, pyrolysis, plasma/electrical discharge); and
xi. Smoke is observed in visual or infra-red wavelengths by pattern recognition algorithms or by motion detection (any or all oxidative decomposition, pyrolysis, plasma/electrical discharge).

As mentioned above, FIG. 1 illustrates the fire 220 in the connection BC22b connecting the vaults B-2 and C-2. Thus, monitors (like the monitors 212E and 212H) in the vaults B-2 and/or C-2 may be used to detect the fire 220. For ease of illustration, the monitor 212E inside the vault B-2 will be described as having detected the fire 220. In this example, the fire detection sensor(s) 216 will be described as being implemented as chemical or gas concentration sensors. Such gas concentration sensors can utilize a variety of physical or chemical technologies, such as infra-red absorbance, florescence quenching, electro-chemical, thermal-conductivity, and/or flame ionization. Gases to be tested for the presence of at least one analyte are conveyed to the sensor(s) passively (e.g., via diffusion and/or natural convection) or by active ventilation. Unfortunately, using prior art methods, this means that each of the connections 210 that is connected to the vault B-2 must be tested to determine from where precisely the detected gases (generated by the fire 220) are emanating. In other words, to answer the third critical question using prior art methods, the gases emanating from each of the connections AB22a, AB22b, BB12, BC22a, BC22b, BB23a and BB23b must be tested separately by individual fire detection sensor(s) each like the fire detection sensor(s) 216.

Figure 2:
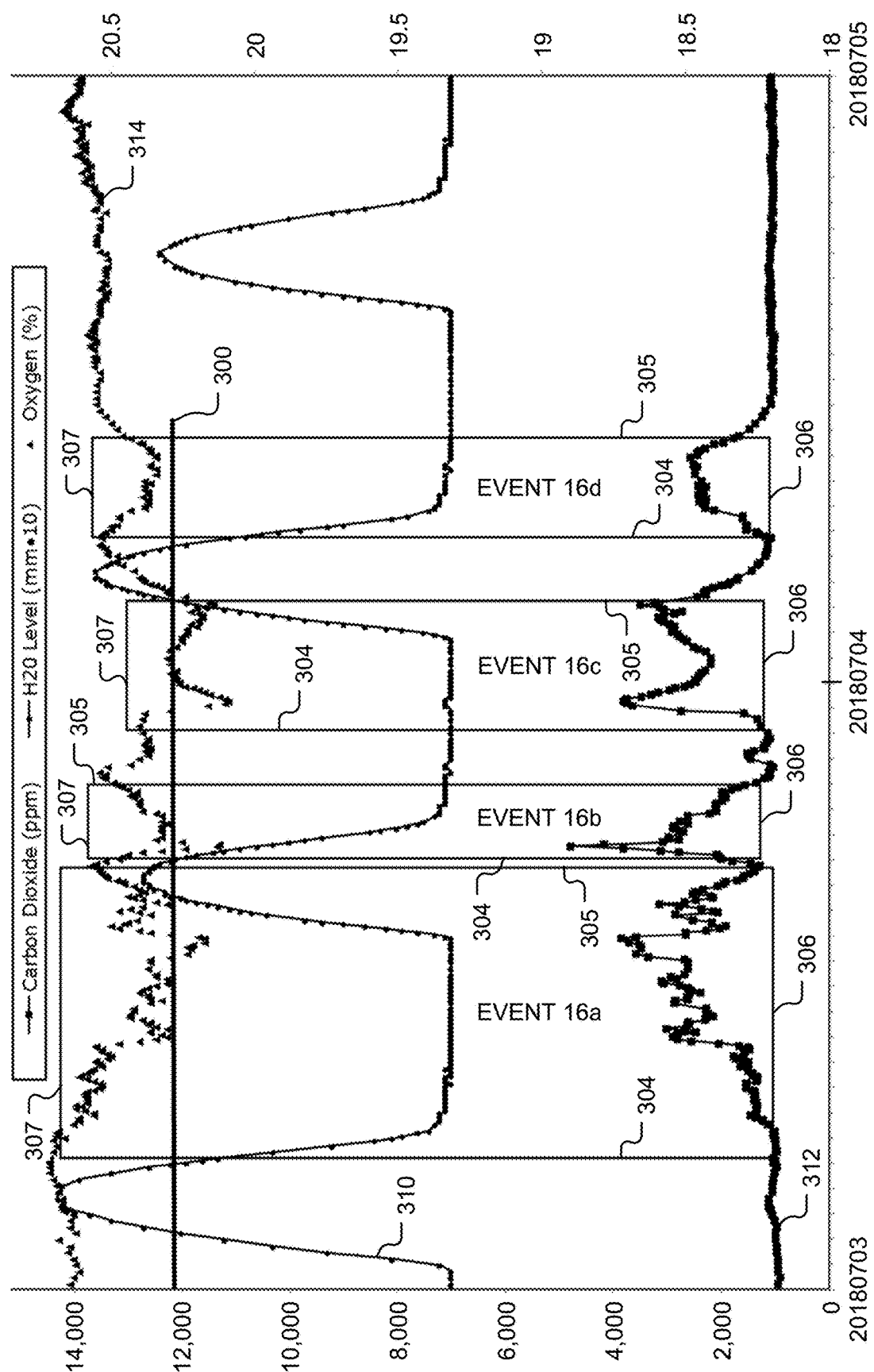
FIG. 2 is a graph illustrating 48 hours of sensor readings collected on Jul. 3, 2018, and Jul. 4, 2018, at an underground vault that is in hydraulic communication with the Atlantic Ocean and is located in a city on the East Coast of the U.S.
Figure 3:
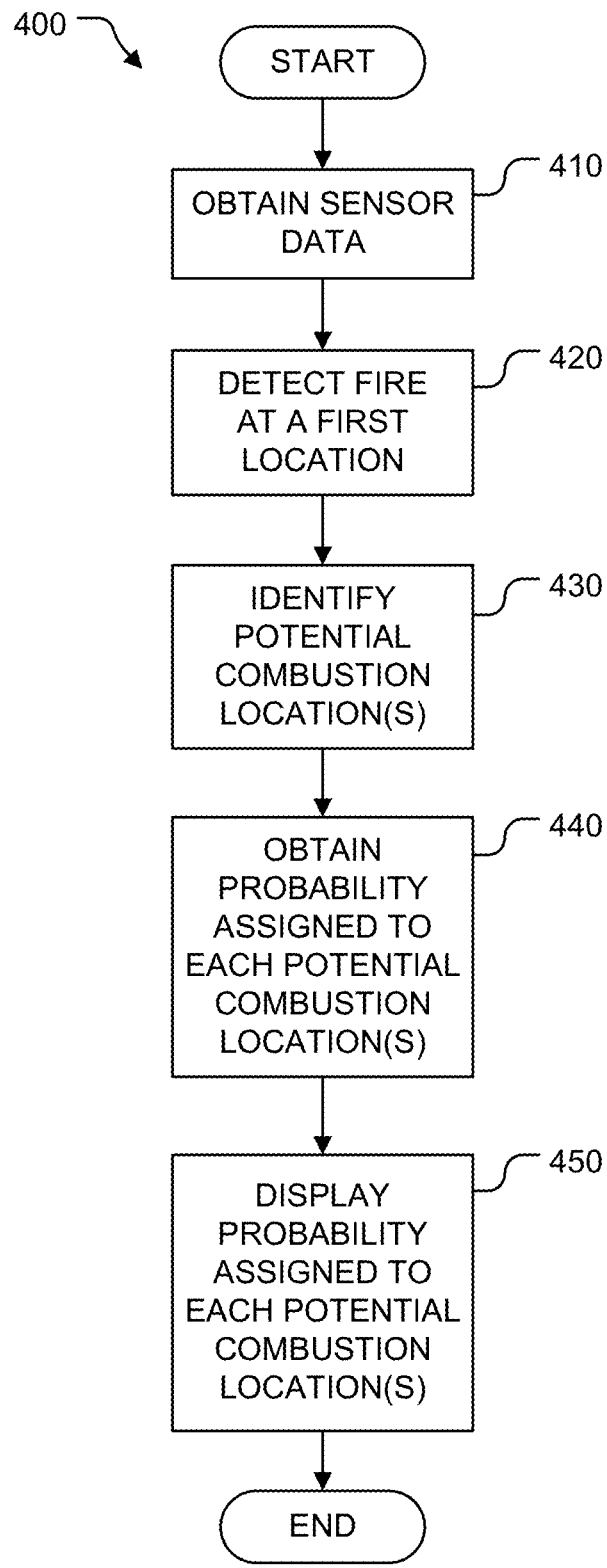
FIG. 3 is a flow diagram of a method that may be performed by a system controller.

FIG. 3 is a flow diagram of a method 400 that may be performed by the system controller 230 (see FIG. 1) and used to at least partially answer the third critical question (e.g., without using the individual fire detection sensor(s) mentioned above). The method 400 may be used to address the third Critical Question where the vaults 208 (see FIG. 1) are in hydraulic communication with ocean tides. For ease of illustration, FIG. 1 omits a third dimension, height above sea level that is critically important because many of the vaults 208 and/or the connections 210 lay at different elevations. Thus, different cables and/or electrical equipment positioned inside the connections 210 and/or vaults 208 are submerged (or not submerged) at different times during a tidal cycle. Fires do not occur under water. Thus, if a connection or vault is submerged under water, gases produced by a fire cannot emanate from that connection or vault. Additionally, when the water inside a connection or vault rises to a level sufficient to extinguish a fire, referred to as an Extinguish Level 300 (see FIG. 2), gases produced by a fire cannot emanate from that connection or vault.

FIG. 2 is a graph illustrating 48 hours of sensor readings collected on Jul. 3, 2018, and Jul. 4, 2018, at an underground vault that is in hydraulic communication with the Atlantic Ocean and is located in a city on the East Coast of the U.S. In FIG. 2, a line 310 illustrates a water level inside the underground vault, a line 312 illustrates a $CO_2$ concentration level, and triangles 314 illustrate an $O_2$ concentration level. FIG. 2 illustrates four related Events 16a-16d during which $CO_2$ and $O_2$ sensors detected gas concentration levels indicative of a fire (e.g., the triangles 314 show the $O_2$ concentration level is decreasing and the line 312 shows the $CO_2$ concentration level is increasing at the start event horizon depicted by a vertical line 304 and decreasing as the event extinguishes at the end event horizon depicted by a vertical line 305). In other words, FIG. 2 illustrates separate Events 16a-16d, during which the fire detection sensor(s) 216 detected a fire (e.g., the fire 220 illustrated in FIG. 1). In FIG. 2, an X-axis is time (24 hours from Jul. 3, 2018 to midnight Jul. 4, 2018), a left hand Y-axis is both parts per million ("ppm") of Analyte (e.g., $CO_2$) and water level measured in millimeters multiplied by 10, and a right hand Y-axis is oxygen concentration expressed as a volume percentage of air.

As mentioned above, each of the Events 16a-16d includes a start event horizon (depicted by the vertical line 304), an end event horizon (depicted by the vertical line 305), and a sensor baseline for each of the fire detection sensor(s) 216. In the example illustrated, each of the Events 16a-16d includes a $CO_2$ sensor baseline (depicted by a horizontal line 306) and an $O_2$ sensor baseline (depicted by a horizontal line 307). Referring to FIG. 2, the Events 16a-16d are delineated with boxes formed by their respective start event horizon, end event horizon, $CO_2$ sensor baseline, and $O_2$ sensor baseline. The start event horizon (depicted by the vertical line 304) of each of the Events 16a-16d is defined as a moment or time that the system controller 230 (see FIG. 1) determined that a fire had begun. The end event horizon (depicted by the vertical line 305) of each of the Events 16a-16d is defined as a moment or time that the System Controller 230 (see FIG. 1) determined the fire had been extinguished.

In FIG. 2, the $CO_2$ sensor baseline (depicted by the horizontal line 306) is a baseline carbon dioxide concentration value detected for each of the Events 16a-16d prior to the event commencement. In the example illustrated, the $CO_2$ sensor baseline of the Event 16a is about 1000 ppm. The $O_2$ sensor baseline (depicted by the horizontal line 307) is a baseline oxygen concentration value detected for each of the Events 16a-16d. In the example illustrated, the $O_2$ sensor baseline of the Event 16a is about 20.6% [right Y-axis]. While FIG. 2 shows two sensor baselines, there can be any number of sensor baselines, each depicted by a horizontal line and for a different one of the fire detection sensor(s) 216 that is deployed and is perturbed by the event.

FIG. 2 demonstrates how the water level sensor 214 (see FIG. 1) and the fire detection sensor(s) 216 (see FIG. 1) may be utilized to find the Extinguish Level 300 at a particular location (e.g., the vault B-2 illustrated in FIG. 1) within the network 200 (see FIG. 1). As mentioned above, in this example, the fire detection sensor(s) 216 have been implemented as gas concentration sensors. Specifically, in this example, the fire detection sensor(s) 216 are implemented as a $CO_2$ sensor and an $O_2$ sensor.

The Extinguish Level 300 is utilized to rule out locations within the network 200 that were submerged prior to the Extinguish Level 300 being reached by the rising tide. Referring to FIG. 1, the locations may include one or more of the vaults 208 and/or one or more of the connections 210 as well as electrical equipment housed therein. As is apparent from FIG. 2, locations that are submerged below the Extinguish Level 300 can be excluded from consideration as a gas source. Also, any potential fire sources (e.g., a cable, equipment, and the like) positioned above the Extinguish Level 300 can also be excluded from consideration as a gas source because if the fire was above the Extinguish Level 300, the fire would likely continue to burn. However, this did not occur in FIG. 2. While it is possible that a fire may self-extinguish and hence a single crossing of the Extinguish Level 300 is not proof positive that the fire lies near the Extinguish Level 300, the multiple crossings of the Extinguish Level 300 illustrated in FIG. 2 confirm that the fire is near the Extinguish Level 300.

For example, the Event 16a begins after the line 310 (water level) drops below about 1220 mm and is extinguished when the tide returns the line 310 (water level) to at least 1220 mm. Event 16b begins after the line 310 (water level) drops below about 1220 mm, and self-extinguishes about three hours later while the line 310 (water level) is still below 1220 mm. The fire rekindles about two hours later as the Event 16c, and is again quenched when the tide rises (as shown by the line 310, which is the water level) above about 1220 mm. Shortly after the tide recedes and the line 310

(water level) falls below 1220 mm, at about 06:30 on Jul. 4, 2018, the fire reignites and thus begins the Event 16*d*. The Event 16*d* self-extinguishes at about 09:30 on Jul. 4, 2018. In other words, the Event 16*a* extinguishes at 1220 mm, the Event 16*b* reignites at 1220 mm, the Event 16*c* extinguishes at 1220 mm, and the Event 16*d* reignites at 1220 mm. These four milestones taken together provide ample assurance that the fire that caused Events 16*a*-16*d* is positioned at about 1220 mm and all ducts and equipment below that level are not harboring the fire and all ducts and equipment above that level are unlikely to be harboring the fire. In other words, this information may be used to pinpoint the elevation of the fire.

Thus, using the information of FIG. 2, the monitor 212E and/or the system controller 230 may determine that the Extinguish Level 300 is about 1220 mm. Specifically, by noticing that the indicia of a fire repeatedly disappeared after the line 310 (water level) exceeded about 1220 mm and that the fire reignited when the line 310 (water level) was below 1220 mm, the monitor 212E and/or the system controller 230 may conclude that the Extinguish Level 300 is about 1220 mm for that location. This process may be repeated for different locations within the network 200 (see FIG. 1) and used to determine the Extinguish Level 300 for each location (e.g., each of the vaults 208).

As mentioned above, FIG. 3 illustrates the method 400, which may be performed by the system controller 230 (see FIG. 1) and used to at least partially answer the third critical question when the vaults 208 (see FIG. 1) are in hydraulic communication with ocean tides. Referring to FIG. 3, in first block 410, the system controller 230 (see FIG. 1) receives sensor data from the monitor 212E (see FIG. 1) installed in the vault B-2 (see FIG. 1). In next block 420, the system controller 230 (see FIG. 1) determines the sensor data indicates that the fire 220 (see FIG. 1) is in progress somewhere within the network 200 (see FIG. 1). In other words, the system controller 230 (see FIG. 1) detects a new start event horizon of a new event. In block 430, the system controller 230 identifies potential combustion locations connected to the vault B-2 (see FIG. 1). For example, in block 430, the system controller 230 may identify the vaults A-2, B-1, B-3, and C-2 as well as the connections AB22*a*, AB22*b*, BB12, BB23*a*, BB23*b*, BC22*a*, and BC22*b*.

In block 440, the system controller 230 obtains a probability assigned to each of the potential combustion locations associated with the current water level in the vault B-2 (see FIG. 1). These probabilities may be used to exclude at least some of the locations from the potential combustion locations.

The probability assigned to each of the potential combustion locations is obtained by analyzing past events detected in the vault B-2 (see FIG. 1). By way of a non-limiting example, the system controller 230 (see FIG. 1) may receive current water level data from the water level sensor 214 positioned within the vault B-2 (see FIG. 1) and compare the current water level data to the previously ascertained and recorded actual vertical positions of any potential fire sources (e.g., cables, components, equipment, and the like) within the potential combustion locations. Those potential fire sources located underwater before the new start event horizon may be assigned zero probability by the system controller 230. By way of another non-limiting example, the system controller 230 may assign a zero probability to each potential fire source known to be underwater at the current time based on the tidal cycle. In other words, the system controller 230 may be configured to determine a tidal water level from the tidal cycle. Furthermore, when the current water level is at the Extinguish Level 300, those potential fire sources positioned above the Extinguish Level 300 (e.g., dry equipment) are less likely to be the location of the fire than potential fire sources positioned near the Extinguish Level 300 (see FIG. 2). The likelihood that dry equipment is involved in the new event decreases with each past event horizon that occurred at about the same extinguish level.

Both an actual vertical position of equipment and an actual water level are subject to measurement error. An estimate of anticipated deviations of these measurements using statistical methods well known in the art are made to compute probabilities that a measured vertical position likely correlates with an actual vertical position. For example, the system controller 230 may calculate a first anticipated deviation between a measurement of the current water level and a measurement of a vertical location of a potential fire source (e.g., equipment). Then, the system controller 230 may determine the measurements are the same when the measurement of the vertical location is within the first anticipated deviation of the measurement of the current water level. In other words, how close the measured vertical position of the potential fire source (e.g., equipment) must be to the measured current water level to be considered the same value may be determined as a non-determinate, probability-based value. As a non-limiting example, the measurement errors may be assumed to be represented by a normal distribution and the anticipated deviation may be represented by a standard deviation. Historical measurements can be utilized to refine anticipated deviations. When the errors are implemented as standard deviations, the standard deviations may be combined to form the first anticipated deviation. For example, the system controller 230 may calculate the first anticipated deviation by combining a standard deviation of measurement errors obtained from measuring the current water level with a standard deviation of measurement errors obtained from measuring the vertical location of the potential fire source.

Similarly, the system controller 230 may determine whether the current water level is at one or more of a plurality of extinguish levels. For example, the system controller 230 may calculate a second anticipated deviation between a measurement of the current water level and a measurement of an extinguishing water level. Then, the system controller 230 may determine the measurements are the same when the measurement of the current water level is within the second anticipated deviation of the measurement of the extinguishing water level. In other words, how close the measured current water level must be to the measured extinguishing water level to be considered the same value may be determined as a non-determinate, probability-based value. As a non-limiting example, the measurement errors may be assumed to be represented by a normal distribution and the anticipated deviation may be represented by a standard deviation. Historical measurements can be utilized to refine anticipated deviations. When the errors are implemented as standard deviations, the standard deviations may be combined to form the second anticipated deviation. For example, the system controller 230 may calculate the second anticipated deviation by combining a standard deviation of measurement errors obtained from measuring the current water level with a standard deviation of measurement errors obtained from measuring the extinguishing water level.

As explained above, the system controller 230 determines the Extinguish Level 300 for the vault B-2 based on past events. The system controller 230 also uses statistical methods well known in the art to assign each of the potential combustion locations a probability that a potential fire source inside the potential combustion location is the actual source of the fire. Those potential combustion locations closest to the Extinguish Level 300 have the highest probabilities, potential combustion locations well below the Extinguish Level 300 are ruled out, and those potential combustion locations positioned above the Extinguish Level 300 have lower probabilities based on a number of times the potential combustion location was above the Extinguish Level 300 during start and end event horizons. To illustrate the calculation of these probabilities, consider three simple scenarios involving first, second, third, and fourth conduits positioned at 111 mm, 222 mm, 333 mm, and 444 mm, respectively.

Scenario 1: A single historical record of an event detected at a vault that was extinguished by a tidal rise to 150 mm, which is between the first and second conduits. Thus, the system controller 230 may conclude that any potential fire sources below 150 mm, such as the first conduit, could not have been the source of that fire. However, the system controller 230 is not able to draw any conclusions with respect to the second, third, or fourth conduits. Thus, the system controller 230 assigns probabilities to the first, second, third, and fourth conduits of 0%, 33.3%, 33.3%, and 33.3%, respectively. These probabilities may be used by the system controller 230 when the system controller 230 detects a next fire at the vault and the water level in the vault is about 150 mm.

Scenario 2: A single historical record of an event detected at the vault that was extinguished by a tidal rise to 220 mm, which is just below the second conduit. Thus, the system controller 230 may conclude that the first conduit could not have been the source of that fire. Further, because the fire extinguished very near the second conduit, the second conduit is most likely to be the fire source. Because the third and fourth conduits are above the water, they are less likely to have been the fire source but cannot be ruled out. Thus, the system controller 230 assigns probabilities to the first, second, third, and fourth conduits of 0%, about 80%, about 10%, and about 10% respectively. These probabilities may be used by the system controller 230 when the system controller 230 detects a next fire at the vault and the water level in the vault is about 220 mm.

Scenario 3: Four historical records of events detected at the vault that were extinguished by a tidal rise to 220 mm and two historical records of events detected at the vault that re-ignited after a tidal decrease to just below 220 mm. This scenario demonstrates that the fire source is very likely located around 220 mm and is therefore most likely within the second conduit. However, the third and fourth conduits cannot be ruled out. Thus, the system controller 230 assigns probabilities to the first, second, third, and fourth conduits of 0%, about 98%, about 1%, and about 1% respectively. These probabilities may be used by the system controller 230 when the system controller 230 detects a next fire at the vault and the water level in the vault is about 220 mm.

As demonstrated above, the system controller 230 assigns probabilities to each of the conduits that are informed by past experience and the probability model is adjusted to comport with post mortem examinations of actual fire events. Thus, as more events are observed, the probabilities are adjusted and become more robust with experience.

In block 450, the system controller 230 displays the probability assigned to each of the potential combustion location(s). The network operator may take actions (e.g., conduct further investigation) with respect to each of the potential combustion location(s) based on the probability assigned to the location. For example, the network operator may cut electrical power to the potential combustion location(s). Then, the network operator may extinguish the fire 220 (see FIG. 1), if one is found to exist. Next, the network operator may clear smoke and flammable vapors from those locations that are affected. For example, the system controller 230 and/or the network operator may instruct the manhole event suppression system 240 to ventilate the vault B-2.

Because the method 400 excludes those portions of the network 200 (see FIG. 1) where the fire cannot be located, the method 400 reduces troubleshooting time, cost, danger, and inconvenience.

Computing Device

Figure 4:
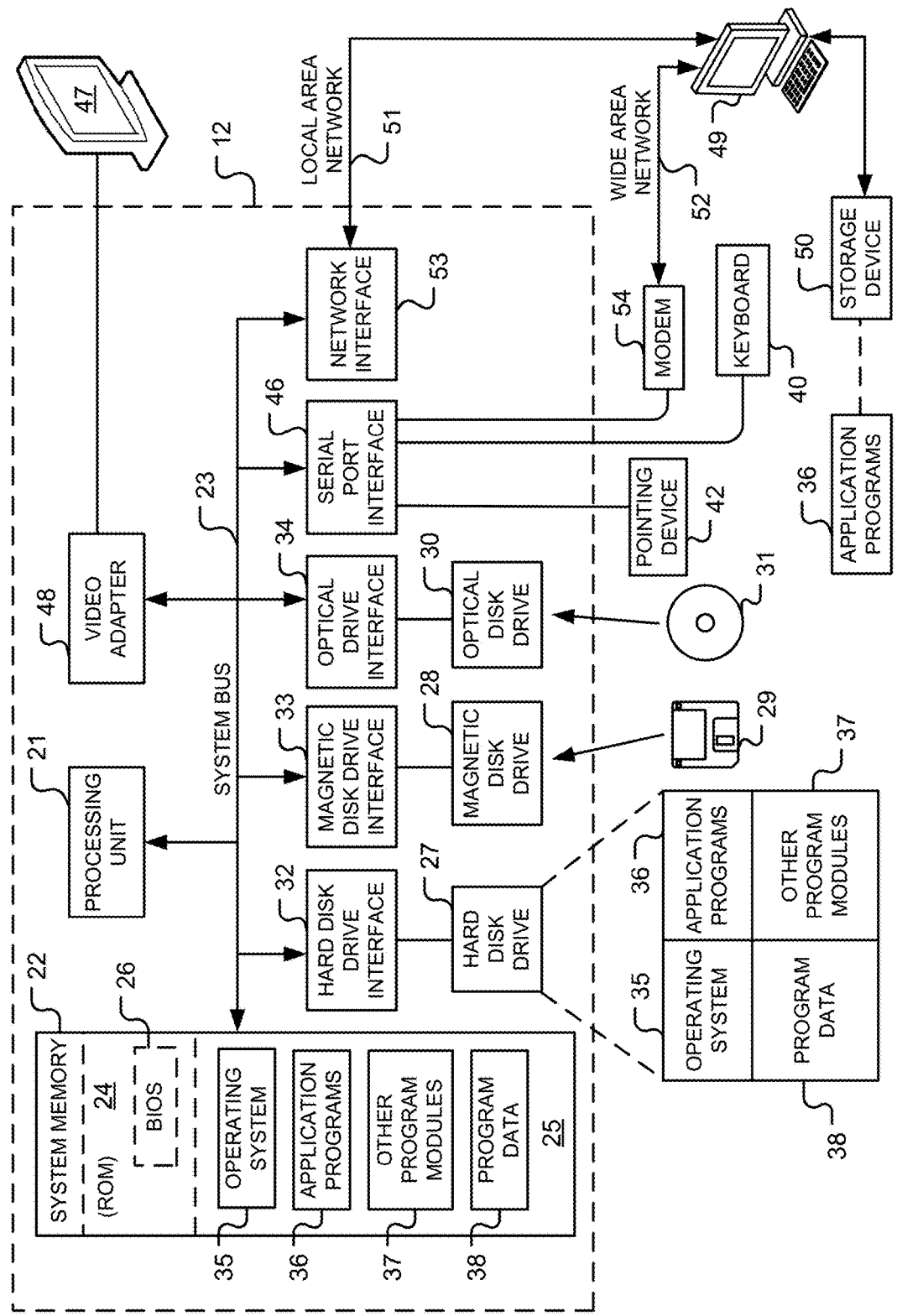
FIG. 4 is a diagram of hardware and an operating environment in conjunction with which implementations of the system controller may be practiced.

FIG. 4 is a diagram of hardware and an operating environment in conjunction with which implementations of the system controller 230 (see FIG. 1) may be practiced. The description of FIG. 4 is intended to provide a brief, general description of suitable computer hardware and a suitable computing environment in which implementations may be practiced. Although not required, implementations are described in the general context of computer-executable instructions, such as program modules, being executed by a computer, such as a personal computer. Generally, program modules include routines, programs, objects, components, data structures, etc., that perform particular tasks or implement particular abstract data types.

Moreover, those of ordinary skill in the art will appreciate that implementations may be practiced with other computer system configurations, including hand-held devices, multi-processor systems, microprocessor-based or programmable consumer electronics, network PCs, minicomputers, mainframe computers, and the like. Implementations may also be practiced in distributed computing environments (e.g., cloud computing platforms) where tasks are performed by remote processing devices that are linked through a communications network. In a distributed computing environment, program modules may be located in both local and remote memory storage devices.

The exemplary hardware and operating environment of FIG. 4 includes a general-purpose computing device in the form of the computing device 12. By way of non-limiting examples, the computing device 12 may be implemented as a laptop computer, a tablet computer, a web enabled television, a personal digital assistant, a game console, a smartphone, a mobile computing device, a cellular telephone, a desktop personal computer, and the like.

The computing device 12 includes a system memory 22, the processing unit 21, and a system bus 23 that operatively couples various system components, including the system memory 22, to the processing unit 21. There may be only one or there may be more than one processing unit 21, such that the processor of computing device 12 includes a single central-processing unit ("CPU"), or a plurality of processing units, commonly referred to as a parallel processing environment. When multiple processing units are used, the processing units may be heterogeneous. By way of a non-limiting example, such a heterogeneous processing environment may include a conventional CPU, a conventional graphics processing unit ("GPU"), a floating-point unit ("FPU"), combinations thereof, and the like.

The computing device 12 may be a conventional computer, a distributed computer, or any other type of computer.

The system bus 23 may be any of several types of bus structures including a memory bus or memory controller, a peripheral bus, and a local bus using any of a variety of bus architectures. The system memory 22 may also be referred to as simply the memory, and includes read only memory (ROM) 24 and random access memory (RAM) 25. A basic input/output system (BIOS) 26, containing the basic routines that help to transfer information between elements within the computing device 12, such as during start-up, is stored in ROM 24. The computing device 12 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules, and other data for the computing device 12. It should be appreciated by those of ordinary skill in the art that any type of computer-readable media which can store data that is accessible by a computer, such as magnetic cassettes, flash memory cards, solid state memory devices ("SSD"), USB drives, digital video disks, Bernoulli cartridges, random access memories (RAMs), read only memories (ROMs), and the like, may be used in the exemplary operating environment. As is apparent to those of ordinary skill in the art, the hard disk drive 27 and other forms of computer-readable media (e.g., the removable magnetic disk 29, the removable optical disk 31, flash memory cards, SSD, USB drives, and the like) accessible by the processing unit 21 may be considered components of the system memory 22.

A number of program modules may be stored on the hard disk drive 27, magnetic disk 29, optical disk 31, ROM 24, or RAM 25, including the operating system 35, one or more application programs 36, other program modules 37, and program data 38. A user may enter commands and information into the computing device 12 through input devices such as a keyboard 40 and pointing device 42. Other input devices (not shown) may include a microphone, joystick, game pad, satellite dish, scanner, touch sensitive devices (e.g., a stylus or touch pad), video camera, depth camera, or the like. These and other input devices are often connected to the processing unit 21 through a serial port interface 46 that is coupled to the system bus 23, but may be connected by other interfaces, such as a parallel port, game port, a universal serial bus (USB), or a wireless interface (e.g., a Bluetooth interface). A monitor 47 or other type of display device is also connected to the system bus 23 via an interface, such as a video adapter 48. In addition to the monitor, computers typically include other peripheral output devices (not shown), such as speakers, printers, and haptic devices that provide tactile and/or other types of physical feedback (e.g., a force feedback game controller).

The input devices described above are operable to receive user input and selections. Together the input and display devices may be described as providing a user interface.

The computing device 12 may operate in a networked environment using logical connections to one or more remote computers, such as remote computer 49. These logical connections are achieved by a communication device coupled to or a part of the computing device 12 (as the local computer). Implementations are not limited to a particular type of communications device. The remote computer 49 may be another computer, a server, a router, a network PC, a client, a memory storage device, a peer device or other common network node, and typically includes many or all of the elements described above relative to the computing device 12. The remote computer 49 may be connected to a memory storage device 50. The logical connections depicted in FIG. 4 include a local-area network (LAN) 51 and a wide-area network (WAN) 52. Such networking environments are commonplace in offices, enterprise-wide computer networks, intranets and the Internet.

Those of ordinary skill in the art will appreciate that a LAN may be connected to a WAN via a modem using a carrier signal over a telephone network, cable network, cellular network, or power lines. Such a modem may be connected to the computing device 12 by a network interface (e.g., a serial or other type of port). Further, many laptop computers may connect to a network via a cellular data modem.

When used in a LAN-networking environment, the computing device 12 is connected to the local area network 51 through a network interface or adapter 53, which is one type of communications device. When used in a WAN-networking environment, the computing device 12 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computing device 12, or portions thereof, may be stored in the remote computer 49 and/or the remote memory storage device 50. It is appreciated that the network connections shown are exemplary and other means of and communications devices for establishing a communications link between the computers may be used.

The computing device 12 and related components have been presented herein by way of particular example and also by abstraction in order to facilitate a high-level view of the concepts disclosed. The actual technical design and implementation may vary based on particular implementation while maintaining the overall nature of the concepts disclosed.

In some embodiments, the system memory 22 stores computer executable instructions that when executed by one or more processors cause the one or more processors to perform all or portions of one or more of the methods (including the method 400 illustrated in FIG. 3) described above. Such instructions may be stored on one or more non-transitory computer-readable media.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B, and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context.

Accordingly, the invention is not limited except as by the appended claims.

The invention claimed is:

1. A method for use with an underground network comprising a plurality of locations, the method comprising:
   receiving, by a system controller, sensor data from at least one sensor located at a first of the plurality of locations;
   determining, by the system controller, the sensor data indicates that a fire is in progress and the first location includes water at an extinguishing water level;
   identifying, by the system controller, one or more of the plurality of locations as one or more potential combustion locations;
   assigning, by the system controller, an estimate of a probability to each of the one or more potential combustion locations, the estimate assigned to each of the one or more potential combustion locations estimating a likelihood that the potential combustion location is an actual combustion source when the water in the first location is at the extinguishing water level; and
   displaying, by the system controller, the estimate of the probability assigned to each of the one or more potential combustion locations.

2. The method of claim 1, wherein the extinguishing water level was computed for at least one past combustion event.

3. The method of claim 1, further comprising:
   instructing, by the system controller, a manhole event suppression system installed in the first location to ventilate the first location.

4. The method of claim 1, wherein the system controller uses sensor data to detect when a plurality of fires are occurring, a start water level corresponding to when each of the plurality of fires was detected, and an end water level corresponding to when each of the plurality of fires extinguished,
   the system controller stores the start water level and the end water level for each of the plurality of fires as experience, and
   the estimate of the probability assigned to each of the one or more potential combustion locations is adjusted by the experience to improve statistical predictions.

5. A method for use with an underground network comprising a vault connected to a plurality of locations, the method comprising:
   receiving, by a system controller, first evidence from the vault that at least one fire occurred in the underground network;
   determining, by the system controller, an end water level when each of the at least one fire extinguished to thereby obtain a plurality of extinguish levels;
   receiving, by the system controller, second evidence from the vault that a new fire is in progress after each of the at least one fire extinguished;
   determining, by the system controller, a current water level while the new fire is in progress;
   for each of the plurality of locations, determining, by the system controller, where the location is located with respect to the current water level;
   determining, by the system controller, whether the current water level is at one or more of the plurality of extinguish levels;
   assigning, by the system controller, a probability value to each of the plurality of locations, (A) the probability value assigned to any of the plurality of locations determined by the system controller to be located at the current water level being a first probability value when the current water level is determined by the system controller to be at one or more of the plurality of extinguish levels, (B) the probability value assigned to any of the plurality of locations determined by the system controller to be located below the current water level being zero, and (C) the probability value assigned to any of the plurality of locations determined by the system controller to be located above the current water level being a second probability value, the first probability value being greater that the second probability value; and
displaying, by the system controller, the probability value assigned to each of the plurality of locations.

6. The method of claim 5, wherein the system controller determines the current water level using a sensor signal received from a water level sensor positioned in the vault.

7. The method of claim 5, wherein the current water level is a tidal water level and the system controller determines the tidal water level from a tidal cycle.

8. The method of claim 5, wherein determining, for each of the plurality of locations, where the location is located with respect to the current water level comprises:
determining a first anticipated deviation;
determining the location is located at the current water level when the location is within the first anticipated deviation of the current water level;
determining the location is below the current water level when the location is not within the first anticipated deviation of the current water level and the location is located below the current water level; and
determining the location is above the current water level when the location is not within the first anticipated deviation of the current water level and the location is located above the current water level.

9. The method of claim 8, wherein determining whether the current water level is at one or more of the plurality of extinguish levels comprises:
determining a second anticipated deviation for each of the plurality of extinguish levels; and
determining the current water level is located at one or more of the plurality of extinguish levels when the current water level is within the second anticipated deviation determined for one or more of the plurality of extinguish levels.

10. The method of claim 8, wherein the first anticipated deviation is determined by combining first and second standard deviations, the first standard deviation being calculated from first measurement errors obtained from measuring the current water level, the second standard deviation being calculated from second measurement errors obtained from measuring the location.

11. The method of claim 5, wherein determining whether the current water level is at one or more of the plurality of extinguish levels comprises:
determining an anticipated deviation for each of the plurality of extinguish levels; and
determining the current water level is located at one or more of the plurality of extinguish levels when the current water level is within the anticipated deviation determined for one or more of the plurality of extinguish levels.

12. The method of claim 11, wherein determining the anticipated deviation for each of the plurality of extinguish levels comprises:
combining first and second standard deviations, the first standard deviation being calculated from first measurement errors obtained from measuring the current water level, the second standard deviation being calculated from second measurement errors obtained from measuring the extinguish level.

13. The method of claim 5, further comprising:
instructing, by the system controller, a manhole event suppression system installed in the underground network to ventilate at least a portion of the underground network.

14. A method for use with an underground network comprising a vault connected to a plurality of locations, the method comprising:
receiving, by a system controller, evidence from the vault that a fire is in progress;
determining, by the system controller, a current water level while the fire is in progress;
for each of the plurality of locations, determining, by the system controller, where the location is located with respect to the current water level;
determining, by the system controller, whether the current water level is at an extinguishing water level;
assigning, by the system controller, a probability value to each of the plurality of locations (A) the probability value assigned to any of the plurality of locations determined by the system controller to be located at the current water level being a first probability value when the current water level is determined by the system controller to be at the extinguishing water level, (B) the probability value assigned to any of the plurality of locations determined by the system controller to be located below the current water level being a second probability value, the first probability value being greater that the second probability value, and (C) the probability value assigned to any of the plurality of locations determined by the system controller to be located above the current water level being a third probability value, the third probability value being greater that the second probability value and less than the first probability value; and
displaying, by the system controller, the probability value assigned to each of the plurality of locations.

15. The method of claim 14, wherein the second probability value is zero.

16. The method of claim 14, wherein the system controller determines the current water level using a sensor signal received from a water level sensor positioned in the vault.

17. The method of claim 14, wherein the current water level is a tidal water level and the system controller determines the tidal water level from a tidal cycle.

18. The method of claim 14, wherein determining, for each of the plurality of locations, where the location is located with respect to the current water level comprises:
determining a first anticipated deviation;
determining the location is located at the current water level when the location is within the first anticipated deviation of the current water level;
determining the location is below the current water level when the location is not within the first anticipated deviation of the current water level and the location is located below the current water level; and
determining the location is above the current water level when the location is not within the first anticipated deviation of the current water level and the location is located above the current water level.

19. The method of claim 18, wherein determining whether the current water level is at the extinguishing water level comprises:
determining a second anticipated deviation; and
determining the current water level is located at the extinguishing water level when the current water level is within the second anticipated deviation of the extinguishing water level.

20. The method of claim 18, wherein the first anticipated deviation is determined by combining first and second standard deviations, the first standard deviation being calculated from first measurement errors obtained from measuring the current water level, the second standard deviation being calculated from second measurement errors obtained from measuring the location.

21. The method of claim 14, wherein determining whether the current water level is at the extinguishing water level comprises:
   determining an anticipated deviation; and
   determining the current water level is located at the extinguishing water level when the current water level is within the anticipated deviation of the extinguishing water level.

22. The method of claim 21, wherein the anticipated deviation is determined by combining first and second standard deviations, the first standard deviation being calculated from first measurement errors obtained from measuring the current water level, the second standard deviation being calculated from second measurement errors obtained from measuring the extinguishing water level.

23. The method of claim 14, further comprising:
   instructing, by the system controller, a manhole event suppression system installed in the underground network to ventilate at least a portion of the underground network.

\* \* \* \* \*